US008761672B2

(12) United States Patent
Yamanaka

(10) Patent No.: US 8,761,672 B2
(45) Date of Patent: Jun. 24, 2014

(54) SHORT-RANGE WIRELESS COMMUNICATION APPARATUS

(75) Inventor: Mariko Yamanaka, Nagoya (JP)

(73) Assignee: Denso Corporation, Kariya (JP)

( * ) Notice: Subject to any disclaimer, the term of this patent is extended or adjusted under 35 U.S.C. 154(b) by 178 days.

(21) Appl. No.: 13/534,429

(22) Filed: Jun. 27, 2012

(65) Prior Publication Data

US 2013/0005261 A1    Jan. 3, 2013

(30) Foreign Application Priority Data

Jun. 30, 2011  (JP) ................................. 2011-145785

(51) Int. Cl.
*H04B 5/00* (2006.01)
(52) U.S. Cl.
USPC .......................... 455/41.2; 455/3.01; 455/3.06
(58) Field of Classification Search
USPC ................ 455/3.01, 41.2, 569.1, 569.2, 3.06; 381/311, 309
See application file for complete search history.

(56) References Cited

U.S. PATENT DOCUMENTS

| | | | | |
|---|---|---|---|---|
| 7,894,863 | B2 * | 2/2011 | Terai | 455/574 |
| 8,019,272 | B2 * | 9/2011 | Masuda | 455/3.01 |
| 2004/0063459 | A1 * | 4/2004 | Yamashita et al. | 455/556.1 |
| 2006/0205349 | A1 * | 9/2006 | Passier et al. | 455/41.2 |
| 2007/0117549 | A1 * | 5/2007 | Arnos | 455/414.1 |
| 2008/0268771 | A1 | 10/2008 | Masuda | |
| 2010/0274370 | A1 | 10/2010 | Ochi | |

FOREIGN PATENT DOCUMENTS

| | | |
|---|---|---|
| JP | 2008-278238 | 11/2008 |
| JP | 2010-004485 | 1/2010 |
| JP | 2010-258956 | 11/2010 |

* cited by examiner

*Primary Examiner* — Sonny Trinh
(74) *Attorney, Agent, or Firm* — Harness, Dickey & Pierce, PLC

(57) ABSTRACT

A short-range wireless communication apparatus comprising a connection device and a control device is disclosed. The connection device connects a sound data transfer protocol and a control data transfer protocol to a communication destination apparatus. When the control device determines that a streaming status reported from the communication destination apparatus with use of the sound data transfer protocol is an output-in-progress state, the control device identifies the state of the communication destination apparatus in accordance with a play status reported from the communication destination apparatus with use of the sound data transfer protocol. When the control device determines that the streaming status is a stopped state, the control device identifies the state of the communication destination apparatus as one of a temporarily-stopped state and a stopped state even if the reported play status is a reproduction-in-progress state.

8 Claims, 13 Drawing Sheets

FIG. 7

| STREAMING STATUS | PLAY STATUS | IDENTIFY |
|---|---|---|
| OUTPUTTING | REPRODUCING | REPRODUCING |
| | FAST-FORWARDING | FAST-FORWARDING |
| | REWINDING | REWINDING |
| | TEMPORARILY STOPPED | TEMPORARILY STOPPED |
| | STOPPED | STOPPED |
| STOPPED | REPRODUCING | TEMPORARILY STOPPED OR STOPPED |
| | FAST-FORWARDING | TEMPORARILY STOPPED OR STOPPED |
| | REWINDING | TEMPORARILY STOPPED OR STOPPED |
| | TEMPORARILY STOPPED | TEMPORARILY STOPPED |
| | STOPPED | STOPPED |

FIG. 13A

MOBILE IN "REPRODUCING-STATE"

REPRO TIME = 0 (RECEIVE REPRO TIME RES SIG)
REPRO TIME = 1 (UPDATE REPRO TIME)
REPRO TIME = 2 (UPDATE REPRO TIME)
REPRO TIME = 3 (UPDATE REPRO TIME)
REPRO TIME = 4 (UPDATE REPRO TIME)
REPRO TIME = 5 (RECEIVE REPRO TIME RES SIG)
REPRO TIME = 6 (UPDATE REPRO TIME)
REPRO TIME = 7 (UPDATE REPRO TIME)

MOBILE IN "STOPPED-STATE"

REPRO TIME = 0 (RECEIVE REPRO TIME RES SIG)
REPRO TIME = 1 (UPDATE REPRO TIME)
REPRO TIME = 2 (UPDATE REPRO TIME)
REPRO TIME = 3 (UPDATE REPRO TIME)
REPRO TIME = 4 (UPDATE REPRO TIME)
REPRO TIME = 0 (RECEIVE REPRO TIME RES SIG)
REPRO TIME = 1 (UPDATE REPRO TIME)
REPRO TIME = 2 (UPDATE REPRO TIME)
REPRO TIME = 3 (UPDATE REPRO TIME)

t

SHORT-RANGE WIRELESS COMMUNICATION APPARATUS

CROSS REFERENCE TO RELATED APPLICATION

The present application is based on and claims priority to Japanese Patent Application Ser. No. 2011-145785 filed on Jun. 30, 2011, disclosure of which is incorporated herein by reference.

TECHNICAL FIELD

The present disclosure relates to a short-range wireless communication apparatus that is capable of connecting a sound data transfer protocol, which has a function of reporting a streaming status concerning sound data, and a control data transfer protocol, which has a function of reporting a play status concerning sound data, to a communication destination apparatus via a short-range wireless communication line.

BACKGROUND

A short-range wireless communication module mounted in a short-range wireless communication apparatus having a short-range wireless communication function can connect a sound data transfer protocol, which defines the transfer of sound data, and a control data transfer protocol, which defines the transfer of control data relating to the control of sound data, to a short-range wireless communication module of a communication destination apparatus via a short-range wireless communication line. The short-range wireless communication module can receive sound data (streaming data) transmitted from the short-range wireless communication module of the communication destination apparatus. JP-2008-278238A corresponding to US/20080268771A discloses that an A2DP (advanced audio distribution profile) and an AVRCP (audio/video remote control profile) are a sound data transfer protocol and a control data transfer protocol, respectively, according to the Bluetooth (registered trademark) communication standard.

The A2DP has a function of reporting the streaming status (e.g., "output in progress" or "stopped") concerning sound data. The AVRCP has a function of reporting the play status (e.g., "reproduction in progress"; "fast-forward in progress", "rewind in progress", "temporarily stopped", or "stopped") concerning sound data. Because of these functions of reporting the streaming status with the A2DP and reporting the play status with the AVRCP, it becomes possible to determine, for instance, that the streaming status is "output in progress" while the play status is "reproduction in progress". Depending on the specifications for the communication destination apparatus, however, the communication destination apparatus may report the streaming status and the play status in such way that identification of the actual state of the communication destination apparatus cannot be made from a combination of the reported streaming status and play status.

SUMMARY

The present disclosure is made in view of the foregoing. It is an object of the present disclosure to provide a short-range wireless communication apparatus that is capable of accurately identifying state of a communication destination apparatus based on a streaming status reported from the communication destination side connection device with use of a sound data transfer protocol and a play status reported from the communication destination side connection device with use of a control data transfer protocol.

According to an example of the present disclosure, a short-range wireless communication apparatus comprising an own connection device and a control device is provided. The own connection device is capable of connecting a sound data transfer protocol, which has a function of reporting a streaming status concerning sound data, and a control data transfer protocol, which has a function of reporting a play status concerning the sound data, to a communication destination side connection device, which is a connection device of a communication destination apparatus and is other than the own connection device, via a short-range wireless communication line. The control device identifies state of the communication destination apparatus based on the streaming status reported from the communication destination side connection device of the communication destination apparatus with use of the sound data transfer protocol and the play status reported from the communication destination side connection device of the communication destination apparatus with use of the control data transfer protocol. When the control device determines that, the streaming status reported from the communication destination side connection device with use of the sound data transfer protocol is an output-in-progress state indicating that a channel for the sound data transfer protocol is open, the control device identifies the state of the communication destination apparatus in accordance with the play status reported from the communication destination side connection device with use of the control data transfer protocol. When the control device determines that the streaming status reported from the communication destination side connection device with use of the sound data transfer protocol is a stopped state indicating that the channel for the sound data transfer protocol is closed, the control device identifies the state of the communication destination apparatus as one of a temporarily-stopped state and a stopped state even if the play status reported from the communication destination side connection device with use of the control data transfer protocol is a reproduction-in-progress state.

According to the above short-range wireless communication apparatus, when the streaming status is the output-in-progress state, that is, when the channel for the sound data transfer protocol is open, the sound data can be transferred. Therefore, when the streaming status is the output-in-progress state, it is possible to identify the state of the communication destination apparatus by preferentially following the play status (e.g., a reproduction-in-progress state, a fast-forward-in-progress state, a rewind-in-progress state, a temporarily-stopped state, a stopped state). Meanwhile, when the streaming status is "stopped", that is, when the channel for the sound data transfer protocol is closed, the sound data cannot be transferred (transfer is impossible). Therefore, when the streaming status is "stopped", it is possible to identify the state of the communication destination apparatus as one of the temporarily-stopped state and the stopped state in accordance with the play status (the state of the communication destination apparatus is prohibited from being identified as the reproduction-in-progress state, the fast-forward-in-progress state and the rewind-in-progress state). As a result, the state of the communication destination apparatus can be accurately identified.

BRIEF DESCRIPTION OF THE DRAWINGS

The above and other objects, features and advantages of the present disclosure will become more apparent from the following detailed description made with reference to the accompanying drawings. In the drawings:

FIG. 7 is a diagram illustrating a relationship to identify state of a mobile phone based on a streaming status and a play status;

FIGS. 13A and 13B are diagrams each illustrating a change in production time.

DETAILED DESCRIPTION

Figure 1:
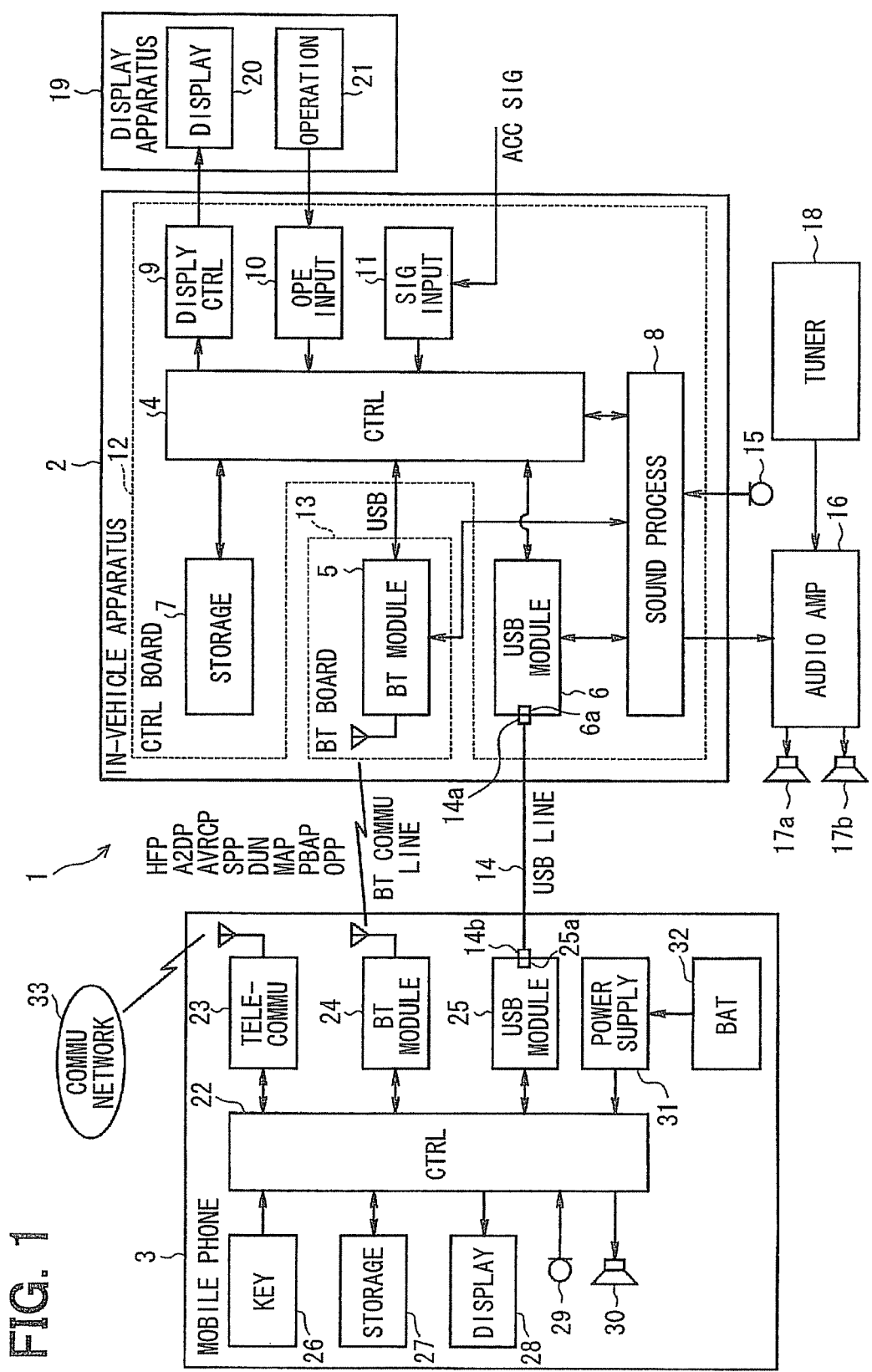
FIG. 1 is a functional block diagram illustrating a BT communication system of one embodiment.

As one embodiment of the present disclosure, a Bluetooth-supporting in-vehicle apparatus having a Bluetooth (hereinafter referred to as BT) communication function will be described with reference to the accompanying drawings. The Bluetooth-supporting in-vehicle apparatus is also simply referred to as in-vehicle apparatus. The following description is given on assumption that a BT-supporting mobile phone (hereinafter simply referred to as the mobile phone) having the BT communication function is carried into a compartment of a vehicle equipped with the in-vehicle apparatus, and that BT communication is performable between the in-vehicle apparatus and the mobile phone.

A BT communication system 1 includes an in-vehicle apparatus 2 (corresponding to a short-range wireless communication apparatus), which is mounted on the vehicle, and the mobile phone 3 (corresponding to a communication destination apparatus), which is carried into the vehicle compartment. The in-vehicle apparatus 2 includes, for example, a control unit 4 (corresponding to a control means and a control device), a BT module 5 (corresponding to a own connection means and a own connection device), a USB (universal serial bus) module 6, a storage unit 7, a voice processing unit 8, a display control unit 9, an operation input unit 10 (corresponding to an operation input means), and a signal input unit 11. The control unit 4, the USB module 6, the storage unit 7, the voice processing unit 8, the display control unit 9, the operation input unit 10, and the signal input unit 11 are physically mounted on a control board 12. The BT module 5 is physically mounted on a BT module board 13, which is separated from the control board 12. The control unit 4 is connected to the BT module 5 by USB.

The control unit 4 includes a microcomputer with, for example, a CPU, a RAM, a ROM, and an I/O bus. The control unit 4 controls generally all of operations of the in-vehicle apparatus 2 including a communication operation, a data management operation and the like. The BT module 5 is connected to a BT module of the mobile phone 3 via a BT communication line (corresponding to a short-range wireless communication line) and capable of performing BT communication via the BT communication line. The BT module 5 is configured to permit simultaneous connection (so-called multiple connection) of multiple profiles defined by the BT communication standard, including, for example, an HFP (hands-free profile) for defining hands-free communication, an A2DP (advanced audio distribution profile) for defining the transfer of sound data (corresponding to a sound data transfer protocol), an AVRCP (audio/video remote control profile) for defining the transfer of control data concerning the control of sound data (corresponding to a control data transfer protocol), an SPP (serial port profile) for defining a virtual serial port for data communication, a DUN (dial-up networking profile) for defining a dial-up connection to the Internet, a MAP (message access profile) for defining the transfer of e-mail data, a PBAP (phone book access profile) for defining the transfer of phone book data, and an OPP (object push profile) for defining the transfer of phone book data. The HFP, A2DP, AVRCP, SPP DUN, MAR PBAP, and OPP, for example, are data communication protocols that are defined on an individual function basis.

The USB module 6 has a connection terminal 6a. A connection terminal 14a of a USB connection cable 14 can be connected to and disconnected from the connection terminal 6a. While the connection terminal 14a of the USB connection cable 14 is connected to the connection terminal 6a and the other connection terminal 14b of the USB connection cable is connected to a connection terminal of a USB module of the mobile phone 3, the USB module 6 can connect a USB communication line to the USB module of the mobile phone 3 and perform USB communication with the mobile phone 3 via the USB communication line.

The storage unit 7 has a storage area for storing various data. When the BT module 5 connects the MAP to the BT module of the mobile phone 3, the storage unit 7 stores e-mail data that is transferred from the mobile phone 3 to the BT module 5. The e-mail data may be, for example, sender information indicative of an e-mail sender, reception date/time information indicative of the date and time of e-mail reception by the mobile phone 3, type information indicative of the type of e-mail, and subject information indicative of an e-mail subject entered, for instance, by a sender. When the BT module 5 connects the PBAP to the BT module of the mobile phone 3, the storage unit 7 stores, for example, phone book data transferred from the mobile phone 3 to the BT module 5, outgoing call history data indicative of the relationship between outgoing call time and outgoing call phone numbers concerning calls made from the in-vehicle apparatus 2 or calls made from the mobile phone 3 that is connected the HFP to the in-vehicle apparatus 2, and incoming call history data indicative of the relationship between incoming call time and incoming call phone numbers concerning calls received by the mobile phone 3 that is connected the HFP to the in-vehicle apparatus 2.

The voice processing unit 8 is connected to a microphone 15 and an audio amplifier 16. The microphone 15 is placed in the vehicle compartment and positioned, for instance, near a steering wheel so as to pick up a user's voice with ease. The audio amplifier 16 is disposed outside the in-vehicle apparatus 2 and connected to loudspeakers 17a, 17b.

When the microphone 15 inputs the voice uttered by the user as transmitted voice data while the HFP is connected between the BT module 5 and the BT module of the mobile phone 3, the voice processing unit 8 subjects the inputted transmitted voice data to audio processing and outputs the processed data to the BT module 5. When received voice data is inputted from the BT module 5, the audio processing unit 8 outputs the inputted received voice data to the audio amplifier 16.

Further, while the A2DP and the AVRCP are connected between the BT module 5 and the BT module of the mobile phone 3, the voice processing unit 8 operates so that sound data transferred from the BT module of the mobile phone 3 to the BT module 5 by the A2DP and the AVRCP is outputted to the audio amplifier 16. Furthermore, while USB communication is performable between the USB module 6 and the USB module of the mobile phone 3, the voice processing unit 8 operates so that sound data transferred from the USB module of the mobile phone 3 to the USB module 6 via the USB communication line is outputted to the audio amplifier 16.

Upon receipt of voice data and sound data from the voice processing unit 8, the audio amplifier 16 amplifies the received voice data and sound data and outputs the amplified data through the loudspeakers 17a, 17b. The audio amplifier 16 is also connected to a tuner deck 18. When, for instance, sound data reproduced from a music recording medium is inputted from the tuner deck 18, the audio amplifier 16 also amplifies the inputted sound data and outputs the amplified data through the loudspeakers 17a, 17b.

A display apparatus 19 includes a display device 20 and an operation device 21. The display device 20 (corresponding to a reproduction time reporting means and a reproduction time reporting device) opens various display screens. The operation device 21 forms on-screen touch switches. Upon receipt of a display command signal from the control unit 4, the display control unit 9 controls the display operation of the display device 20 in the display system 19 in accordance with the inputted display command signal. When the user operates an on-screen touch switch (e.g., touch key or touch button), causing an operation detection signal to be inputted from the operation device 21, the operation input unit 10 outputs the inputted operation detection signal to the control unit 4. The control unit 4 analyzes the operation detection signal inputted from the operation input unit 10, thereby identifying the user's operation.

If a music reproduction screen, which is related to the reproduction of music, is opened by the display device 20, various touch switches relating to the reproduction of music, are formed on the music reproduction screen. The various touch switches may include a reproduction (PLAY) switch, a fast-forward (FWD) switch, a rewind (REW) switch, a pause. (PAUSE) switch, and a stop (STOP) switch. When the control unit 4 determines, by receiving an operation detection signal from the operation device 21, that a certain switch on the music reproduction screen is operated by the user, the control unit 4 analyzes the operation detection signal inputted from the operation input unit 10 to identify (determine) which one of a reproduction operation, a fast-forward operation, a rewind operation, a pause operation, or a stop operation is the user's operation.

The signal input unit 11 is connected to an ACC (accessory) switch mounted on the vehicle. Upon receipt of an ACC signal from the ACC switch, the signal input unit 11 outputs the inputted ACC signal to the control unit 4. The control unit 4 turns on or off a device power supply depending on whether the inputted ACC signal is on or off. More specifically, the control unit 4 turns on the device power supply (starts the in-vehicle apparatus 2) at a timing at which the ACC signal changes from off to on, and turns off the device power supply (stops the in-vehicle apparatus 2) at a timing at which the ACC signal changes from on to off.

The mobile phone 3 includes a control unit 22, a telephone communication unit 23, a BT module 24 (corresponding to a connection means and a connection device of the communication destination apparatus), a USB module 25, a key input unit 26, a storage unit 27, a display unit 28, a microphone 29, a loudspeaker 30, and a power supply unit 31. The BT module 24 is also referred to as a communication destination side connection means or device.

The control unit 22 includes a microcomputer with, for example, a CPU, a RAM, a ROM, and an I/O bus. The control unit 22 controls generally all of operations of the mobile phone 3 including a, communication operation, a data management operation and the like. The telephone communication unit 23 performs telephone communication with a communication network 33. The communication network 33 includes a mobile phone base station, a base station control apparatus, and other well-known equipment that provide mobile phone communication services. The BT module 24 has a function of connecting a BT communication line to the BT module 5 of the in-vehicle apparatus 2 and performing BT communication with the in-vehicle apparatus 2 via the BT communication line, and is configured to be able to simultaneously connect multiple profiles defined by the BT communication standard, such as the HFP, A2DP, AVRCP, SPP, DUN, MAP, PBAP, and OPP.

The USB module 25 has a connection terminal 25a. The connection terminal 25a can be connected to and disconnected from the connection terminal 14b of the USB connection cable 14. While the connection terminal 14a of the USB connection cable 14 is connected to the connection terminal 6a of the USB module 6 of the in-vehicle apparatus 2 and the other connection terminal 14b of the USB connection cable 14 is connected to the connection terminal 25a, the USB module 25 can connect a USB communication line to the USB module 6 in the in-vehicle apparatus 2 and perform USB communication via the USB communication line.

The key input unit 26 has various keys that can be operated by the user. When the user operates a key, the key input unit 26 outputs an operation detection signal to the control unit 22. The control unit 22 then analyzes the operation detection signal inputted from the key input unit 26 to identify the user's operation. The storage unit 27 has a storage area for storing various data. Upon receipt of a display command signal from the control unit 22, the display unit 28 opens various display screens in accordance with the inputted display command signal. When a voice uttered by the user is inputted through the microphone 29 as transmitted voice data, the control unit 22 subjects the inputted transmitted voice data to audio processing. When received voice data is inputted from the telephone communication unit 23, the control unit 22 outputs the inputted received voice data from the loudspeaker 30 as a voice. The power supply unit 31 operates so that electrical power discharged from a battery 32, which is detachable from a main body, is supplied to various functional blocks as operating power.

In the above configuration, the control unit 22 of the mobile phone 3 has various functions concerning the musical reproduction of sound data (e.g., music data) stored (e.g., registered) in the storage unit 27. More specifically, the control unit 22 has, for example, a function of reproducing the sound data, a function of fast-forwarding the sound data, a function of rewinding the sound data, a function of bringing the sound data to a pause, and a function of stopping the sound data. Further, the A2DP, which is connected between the BT module 5 and the BT module 24, has a function of reporting a streaming status concerning the sound data. In a situation where the BT module 24 transmits the sound data to the BT module 5, the streaming status, reported from the BT module 24 to the BT module 5 is either "output in progress" or "stopped": In a situation where the channel for the A2DP is open, that is, the sound data can be transferred, the reported streaming status is "output in progress". In a situation where the channel for the A2DP is closed, that is, the sound data cannot be transferred, the reported streaming status is "stopped".

Moreover, the AVRCP connected between the BT module 5 and the BT module 24 has a function of reporting a play status concerning the sound data. In a situation where the sound data is transmitted from the BT module 24 to the BT module 5, the play status reported from the BT module 24 to the BT module 5 is "reproduction in progress (PLAY)", "fast-forward in progress (FWD)", "rewind in progress (REW)", "temporarily stopped (PAUSE)", or "stopped (STOP)".

When the control unit 4 of the in-vehicle apparatus 2 determines that the user inputs a user operation concerning music reproduction (e.g., the above-mentioned reproduction operation, fast-forward operation, rewind operation, pause operation, or stop operation) to the operation device 21 while the A2DP and AVRCP are connected between the BT module 5 and the BT module 24, the control unit 4 causes the BT module 5 to transmit an operation signal, which indicates the operation performed by the user, to the BT module 24.

When the control unit 22 of the mobile phone 3 determines that an operation signal transmitted from the BT module 24 is received by the BT module 5, the control unit 22 executes the function relating to the operation indicated by the received operation signal (e.g., the aforementioned function of reproducing the sound data, fast-forwarding the sound data, rewinding the sound data, bringing the sound data to a pause, or stopping the sound data), causes the BT module 24 to report the streaming status to the BT module 5 with use of the A2DP, and causes the BT module 24 to report the play status to the BT module 5 with use of the AVRCP.

Since the BT module 24 reports the streaming status to the BT module 5 with use of the A2DP and reports the play status to the BT module 5 with use of the AVRCP as described above, the control unit 4 can identify the state of the mobile phone 3 as either one of "reproduction in progress", "fast-forward in progress", "rewind in progress", "temporarily stopped", and "stopped" based on the streaming status and play status reported from the BT module 24 to the BT module 5.

Operations performed by the BT communication system 1 will now be described with reference to FIGS. 2 to 13. FIGS. 2 to 6 are flowcharts illustrating processes performed by the control unit 4 of the in-vehicle apparatus 2.

In the in-vehicle apparatus 2, the control unit 4 performs a main process while the in-vehicle apparatus 2 is on (the ACC switch is on), and performs a user operation input check process and a reproduction time display process as sub-processes for the main process. These processes will now be described in sequence.

Figure 2:
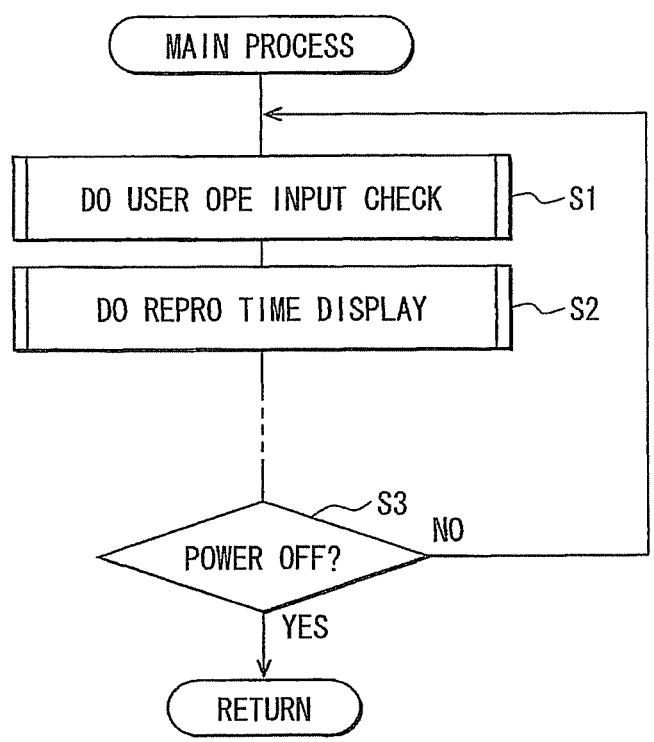
FIG. 2 is a flowchart illustrating a main process performed by an in-vehicle apparatus.

(1) Main Process (See FIG. 2)

When the control unit 4 determines that the in-vehicle apparatus 2 is turned on, the control unit 4 initiates the main process and then periodically performs the user operation input check process and reproduction time display process at predetermined time intervals until the control unit 4 determines that the in-vehicle apparatus 2 is turned off (steps S1 to S3).

Figure 3:
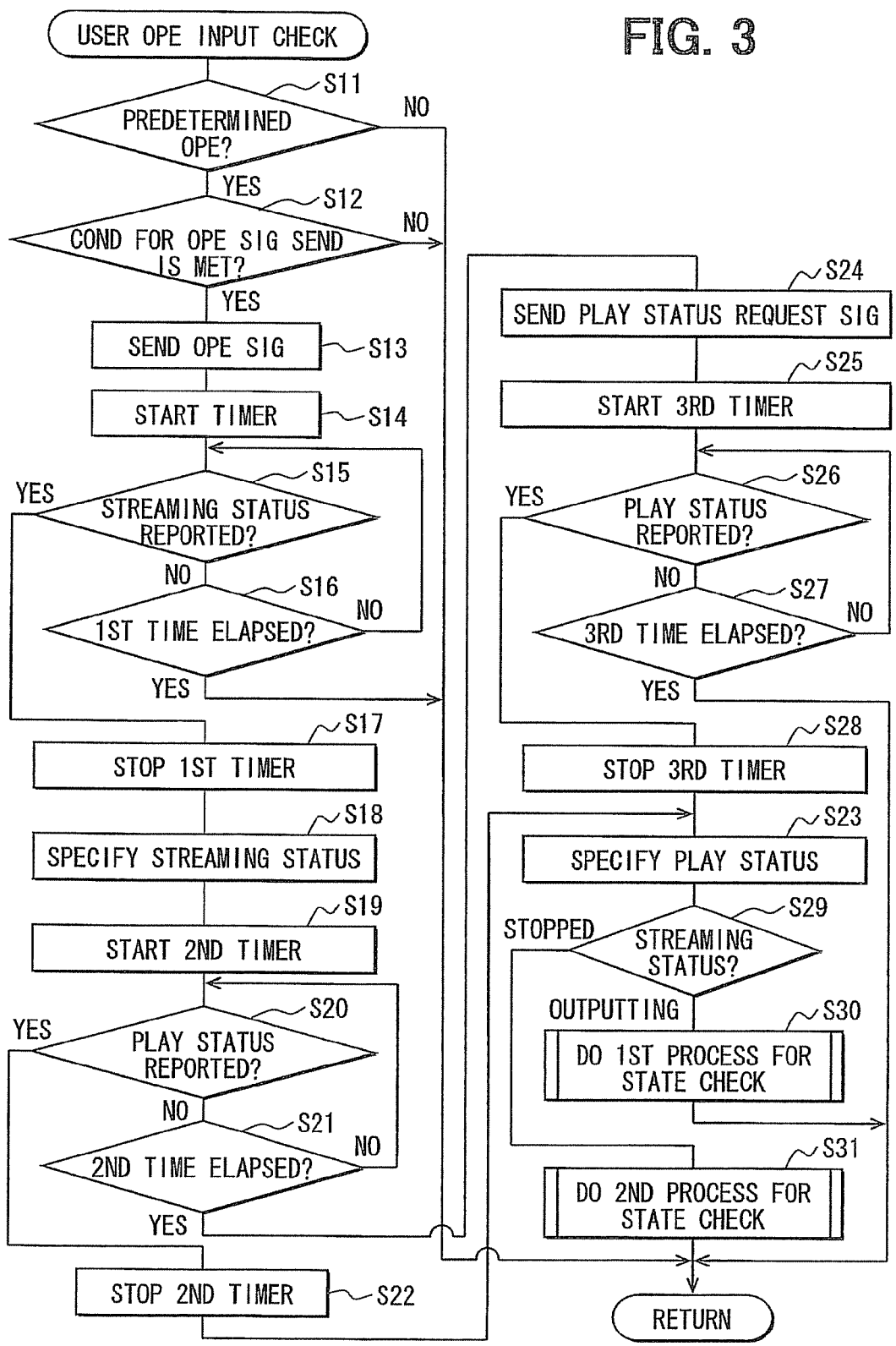
FIG. 3 is a flowchart illustrating a user operation input check process performed by an in-vehicle apparatus.
Figure 4:
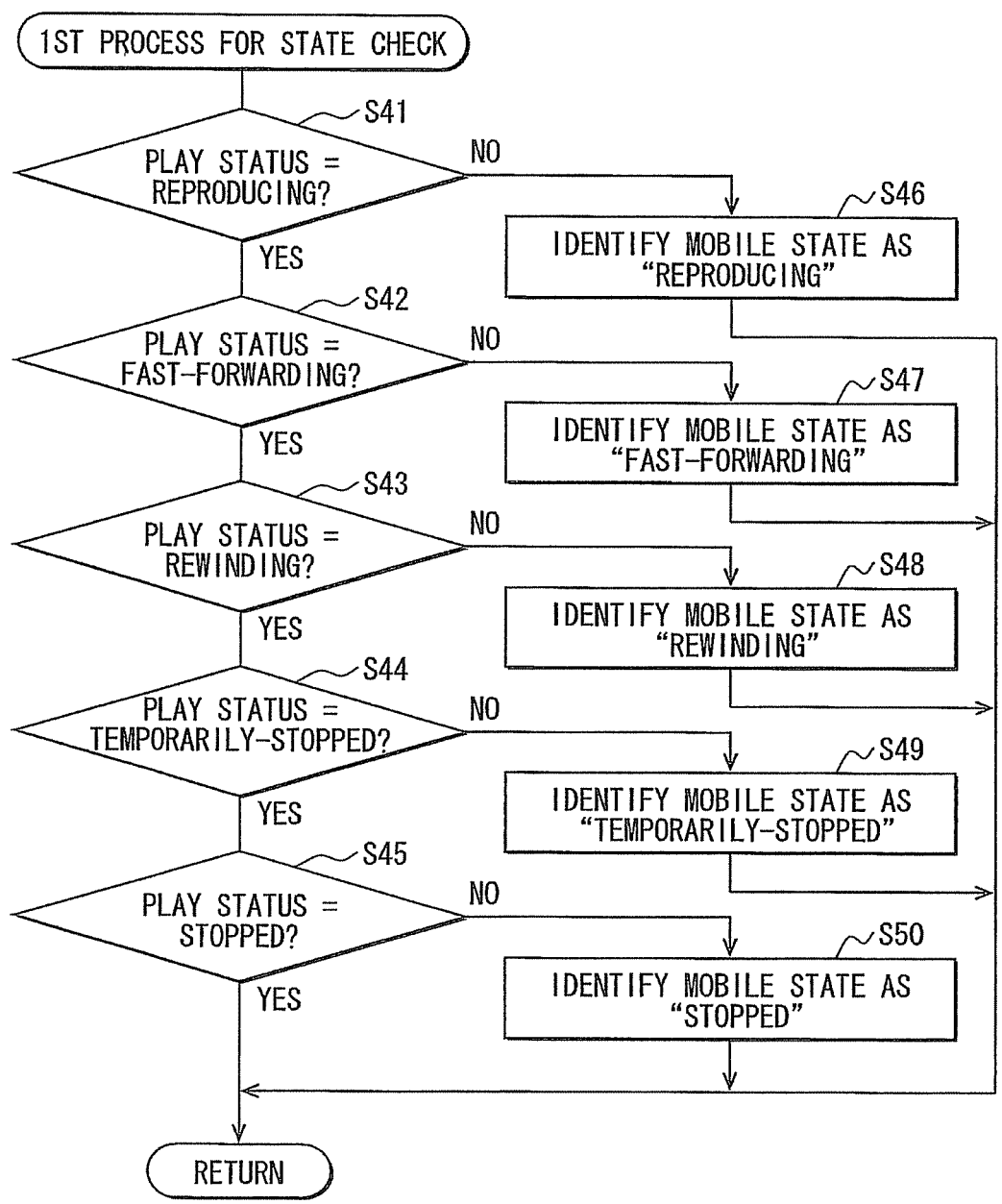
FIG. 4 is a flowchart illustrating a state identification process in "output-in-progress" streaming status.
Figure 5:
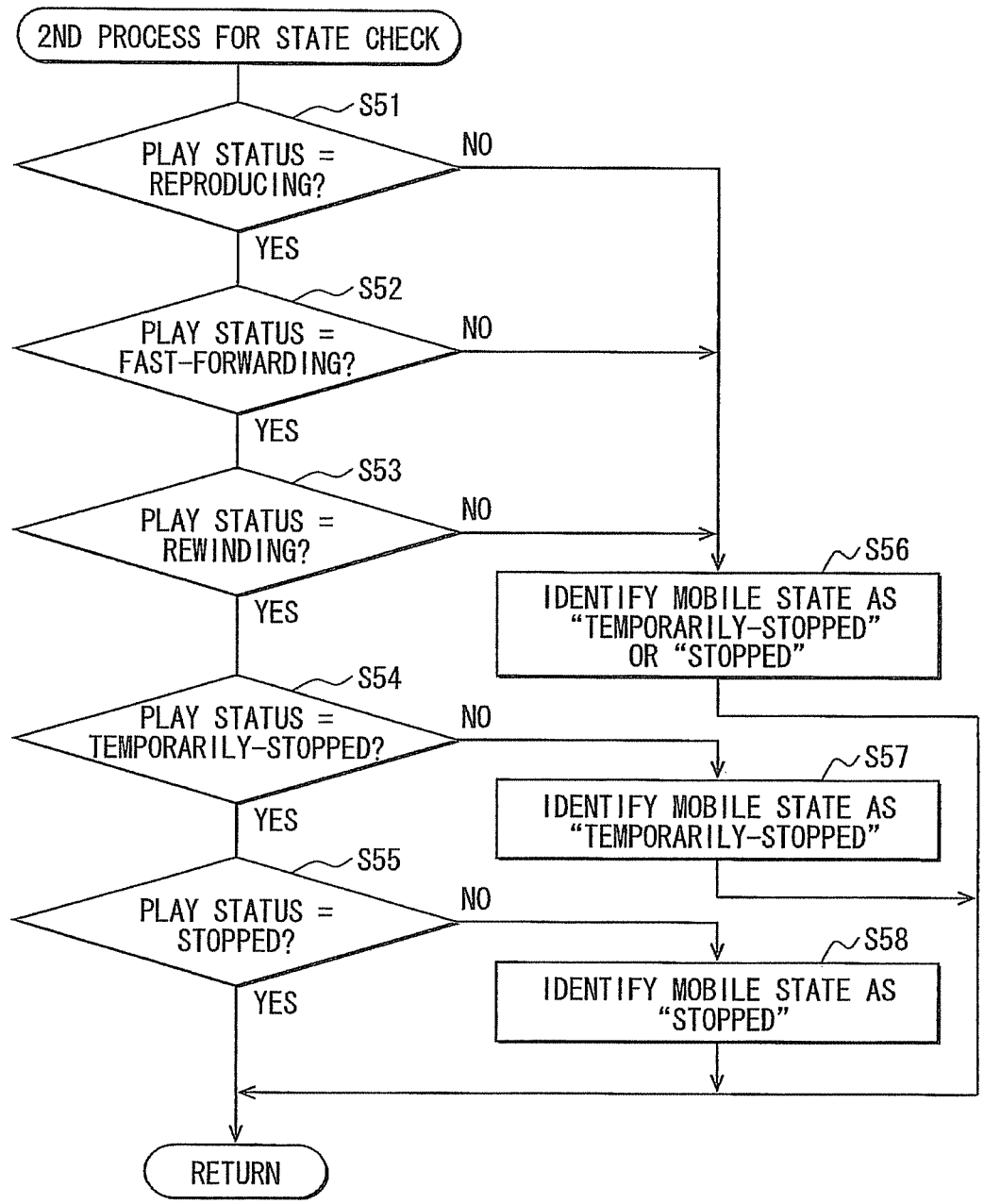
FIG. 5 is a flowchart illustrating a state identification process in "stopped" streaming status.

(2) User Operation Input Check Process (See FIGS. 3 to 5)

When the process enters the user operation input check from the main process, the control unit 4 initiates the user operation input check process and determines whether the user has performed an operation concerning music reproduction (reproduction operation, fast-forward operation, rewind operation, pause operation, or stop operation) to the operation device 21 (step S11). When the control unit 4 receives the operation detection signal from the operation input unit 10 and determines that the user has performed the operation concerning music reproduction to the operation device 21 (when the query in step S11 is answered "YES"), the control unit 4 determines whether a condition for transmitting an operation signal (operation command) indicative of the operation performed by user is satisfied (whether to permit the transmission) (step S12).

If the control unit 4 determines that the user-performed operation concerning music reproduction does not correspond to (is in disagreement with) the currently-identified state of the mobile phone 3, the control unit 4 determines that the condition for transmitting the operation signal is satisfied (the query in step S12 is answered "YES"), and allows the BT module 5 to transmit the operation signal to the BT module 24 (step S13). If, on the other hand, the control unit 4 determines that the user-performed operation concerning music reproduction corresponds to (is in agreement with), the currently-identified state of the mobile phone 3, the control unit 4 determines that the condition for transmitting the operation signal is not satisfied (the transmission is rejected) (the query in step S12 is answered "NO"), ends the user operation input check process without allowing the BT module 5 to transmit the operation signal to the BT module 24, and returns to the main process.

In other words, when the user performs the reproduction operation to the operation device 21, if the state of the mobile phone 3 is identified as not "reproduction in progress" (i.e., the state of the mobile phone 3 is identified as "fast-forward in progress", "rewind in progress", "temporarily stopped", or "stopped"), the control unit 4 determines that the condition for transmitting the reproduction operation signal (reproduction command) is satisfied, and allows the BT module 5 to transmit the reproduction operation signal to the BT module 24. If the state of the mobile phone 3 is identified as "reproduction in progress", the control unit 4 determines that the condition for transmitting the reproduction operation signal is not satisfied, and does not allow the BT module 5 to transmit the reproduction operation signal to the BT module 24.

Similarly, when the user has performed a fast-forward operation to the operation device 21, if the state of the mobile phone 3 is identified as not "fast-forward in progress", the control unit 4 allows the BT module 5 to transmit a fast-forward operation signal (fast-forward command) to the BT module 24. If the state of the mobile phone 3 is identified as "fast-forward in progress", the control unit 4 does not allow the BT module 5 to transmit the fast-forward operation signal to the BT module 24. Likewise, when the user has performed a rewind operation to the operation device 21, if the state of the mobile phone 3 is identified as not "rewind in progress", the control unit 4 allows the BT module 5 to transmit a rewind operation signal (rewind command) to the BT module 24. If the state of the mobile phone 3 is identified as "rewind in progress", the control unit 4 does not allow the BT module 5 to transmit the rewind operation signal to the BT module 24.

Further, when the user has performed a pause operation to the operation device 21, if the state of the mobile phone 3 is identified as not "temporarily stopped", the control unit 4 allows the BT module 5 to transmit a pause operation signal (pause command) to the BT module 24. If the state of the mobile phone 3 is identified as "temporarily stopped", the control unit 4 does not allow the BT module 5 to transmit the pause operation signal to the BT module 24. Likewise, when the user has performed a stop operation to the operation device 21, if the state of the mobile phone 3 is identified as not "stopped", the control unit 4 allows the BT module 5 to transmit a stop operation signal (stop command) to the BT module 24. If the state of the mobile phone 3 is identified as "stopped", the control unit 4 does not allow the BT module 5 to transmit the stop operation signal to the BT module 24.

After the operation signal is transmitted from the BT module 5 to the BT module 24, the control unit 4 causes a first timer to count a first predetermined time (step S14), and waits for the BT module 24 to report the streaming status to the BT module 5 with use of the A2DP for the first predetermined time (steps S15 and S16). The first predetermined time is set, for instance, by a manufacturer of the in-vehicle apparatus 2 and slightly longer than a time required from a time when the mobile phone 3 in a normal operation receives the operation signal and a time when the mobile phone 3 reports the streaming status.

When the control unit 22 of the mobile phone 3 determines that the operation signal transmitted from the BT module 5 is received by the BT module 24, the control unit 22 executes a function corresponding to the operation indicated by the received operation signal, allows the BT module 24 to report the streaming status to the BT module 5 with use of the A2DP, and allows the BT module 24 to report the play status to the BT module 5 with use of the AVRCP.

In other words, when the control unit 22 determines that the reproduction operation signal transmitted from the BT module 5 is received by the BT module 24, the control unit 22 changes the state of the mobile phone 3 to "reproduction in progress", starts reproducing the sound data, reports the streaming status as "output in progress", and reports the play status as "reproduction in progress". Further, when the control unit 22 determines that the fast-forward operation signal transmitted from the BT module 5 is received by the BT module 24, the control unit 22 changes the state of the mobile phone 3 to "fast-forward in progress", starts fast-forwarding the sound data, reports the streaming status as "output in progress", and reports the play status as "fast-forward in progress". Furthermore, when the control unit 22 determines that the rewind operation signal transmitted from the BT module 5 is received by the BT module 24, the control unit 22 changes the state of the mobile phone 3 to "rewind in progress", starts rewinding the sound data, reports the streaming status as "output in progress", and reports the play status as "rewind in progress".

Moreover, when the control unit 22 determines that the pause operation signal transmitted from the BT module 5 is received by the BT module 24, the control unit 22 changes the state of the mobile phone 3 to "temporarily stopped", starts to temporarily stop the sound data, reports the streaming status as "output in progress", and reports the play status as "temporarily stopped". Likewise, when the control unit 22 determines that the stop operation signal transmitted from the BT module 5 is received by the BT module 24, the control unit 22 changes the state of the mobile phone 3 to "stopped", starts to stop the sound data, reports the streaming status as "output in progress", and reports the play status as "stopped".

If the control unit 4 determines that the streaming status is reported from the BT module 24 to the BT module 5 with use of the A2DP before the time-out of the first timer, in other words, before the first predetermined time has elapsed (if the query in step S15 is answered "YES"), the control unit 4 causes the first timer to terminate its counting (step S17), specifies the streaming status reported from the BT module 24 to the BT module 5 (step S18), causes a second timer to start counting a second predetermined time (step S19), and waits for the BT module 24 to report the play status to the BT module 5 with use of the AVRCP for the second predetermined time (corresponding to a predetermined time) (steps S20 and S21). As is the case with the first predetermined time, the second predetermined time is set, for instance, by a manufacturer of the in-vehicle apparatus 2 and slightly longer than the time required from a time when the mobile phone 3 in normal operation reports the streaming data and to a time when the mobile phone 3 reports the play status.

Meanwhile, if the control unit 4 determines that the time counted by the first timer reaches the first predetermined time prior to the reporting of the streaming status from the BT module 24 to the BT module 5 with use of the A2DP (if the query in step S16 is answered "YES"), the control unit 4 ends the user operation input check process and returns to the main process. In this instance, the control unit 4 may output a display command signal to the display control unit 9 and cause the display device 20 to open a streaming status unreported screen (not shown), which indicates that the streaming status is not reported, from the mobile phone 3, for the purpose of notifying the user that the streaming status is not reported from the mobile phone 3, namely, the mobile phone 3, which is a communication destination, has not reported the streaming status for some reason.

If the control unit 4 determines that the play status is reported from the BT module 24 to the BT module 5 with use of the AVRCP before the time-out of the second timer, i.e., before the elapse of the second predetermined time (if the query in step S20 is answered "YES"), the control unit 4 causes the second timer to terminate its counting (step S22), and specifies the play status reported from the BT module 24 to the BT module 5 (step S23).

Meanwhile, if the control unit 4 determines that the time counted by the second timer reaches the second predetermined time prior to the reporting of the play status from the BT module 24 to the BT module 5 with use of the AVRCP (if the query in step S21 is answered "YES"), the control unit 4 causes the BT module 5 to transmit a play status request signal to the BT module 24 (step S24) without ending the user operation input check process and returning to the main process, causes a third timer to start counting a third predetermined time (step 25), and waits again for the BT module 24 to report the play status to the BT module 5 with use of the AVRCP for the third predetermined time (steps S26 and S27). As is the case with the first and second predetermined times, the third predetermined time is set, for instance, by a manufacturer of the in-vehicle apparatus 2 and slightly longer than the time required from the time when the mobile phone 3 in normal operation receives the play status request signal to a time when the mobile phone 3 reports the play status.

When the control unit 22 of the mobile phone 3 determines that the play status request signal transmitted from the BT module 5 is received by the BT module 24, the control unit 22 causes the BT module 24 to report the play status to the BT module 5 with use of the AVRCP.

If the control unit 4 determines that the play status is reported from the BT module 24 to the BT module 5 with use of the AVRCP before the time-out of the third timer, i.e., before the time counted by the third timer reaches the third predetermined time (if the query in step S26 is answered "YES"), the control unit 4 causes the third timer to terminate its counting (step S28) and specifies the play status reported from the BT module 24 to the BT module 5 (step S23).

Meanwhile, if the control unit 4 determines that the time counted by the third timer reaches the third predetermined time before the reporting of the play status from the BT module 24 to the BT module 5 with use of the AVRCP (if the query in step S27 is answered "YES"), the control unit 4 ends the user operation input check process and returns to the main process. In this instance, the control unit 4 may output a display command signal to the display control unit 9 and cause the display device 20 to open a play status unreported screen (not shown), which indicates that the play status is not reported from the mobile phone 3, for the purpose of notifying the user that the play status is not reported from the mobile phone 3, namely, the mobile phone 3, which is a communication destination, has not reported the play status for some reason.

After specifying the streaming status reported from the BT module 24 to the BT module 5 and the play status reported from the BT module 24 to the BT module 5, the control unit 4 determines whether the specified streaming status is "output in progress" or "stopped" (step S29). If the control unit 4 determines that the specified streaming status is "output in progress", the control unit 4 proceeds to perform a state identification process in "output-in-progress" streaming status (step S30). The state identification process in "output-in-progress" streaming status is also referred to as a first process for state check. Upon completion of the state identification process in "output-in-progress" streaming status, the control unit 4 ends the user operation input check process and returns to the main process. If, on the other hand, the control unit 4 determines that the specified streaming status is "stopped", the control unit 4 proceeds to perform a state identification process in "stopped" streaming status (step S31). The state identification process in "stopped" streaming status is also referred to as a second process for state check. Upon completion of the state identification process in "stopped" streaming status, the control unit 4 ends the user operation input check process and returns to the main process.

When the process changes from the user operation input check process to the state identification process in "output-in-progress" streaming status as illustrated in FIG. 4 and the control unit 4 initiates the state identification process in "output-in-progress" streaming status, the control unit 4 determines whether the play status specified by the user operation input check process is "reproduction in progress", "fast-forward in progress", "rewind in progress", "temporarily stopped", or "stopped" (steps S41 to S45).

If the control unit 4 determines that the play status is "reproduction in progress" (if the query in step S41 is answered "YES"), the control unit 4 identifies the state of the mobile phone 3 as "reproduction in progress" (step S46), ends the state identification process in "output-in-progress" streaming status, and returns to the user operation input check process. If the control unit 4 determines that the play status is "fast-forward in progress" (if the query in step S42 is answered "YES"), the control unit 4 identifies the state of the mobile phone 3 as "fast-forward in progress" (step S47), ends the state identification process in "output-in-progress" streaming status, and returns to the user operation input check process. If the control unit 4 determines that the play status is "rewind in progress" (if the query in step S43 is answered "YES"), the control unit 4 identifies the state of the mobile phone 3 as "rewind in progress" (step S48), ends the state identification process in "output-in-progress" streaming status, and returns to the user operation input check process.

If the control unit 4 determines that the play status is "temporarily stopped" (if the query in step S44 is answered "YES"), the control unit 4 identifies the state of the mobile phone 3 as "temporarily stopped" (step S49), ends the state identification process in "output-in-progress" streaming status, and returns to the user operation input check process. If the control unit 4 determines that the play status is "stopped" (if the query in step S45 is answered "YES"), the control unit 4 identifies the state of the mobile phone 3 as "stopped" (step S50), ends the state identification process in "output-in-progress" streaming status, and returns to the user operation input check process.

Meanwhile, when the process changes from the user operation input check process to the state identification process in "stopped" streaming status as illustrated in FIG. 5 and the control unit 4 initiates the state identification process in "stopped" streaming status, the control unit 4 determines whether the play status specified in the user operation input check process is "reproduction in progress", "fast-forward in progress", "rewind in progress", "temporarily stopped", or "stopped" (steps S51 to S55).

If the control unit 4 determines that the play status is "reproduction in progress" (if the query in step S51 is answered "YES"), if the control unit 4 determines that the play status is "fast-forward in progress" (if the query in step S52 is answered "YES"), or if the control unit 4 determines that the play status is "rewind in progress" (if the query in step S53 is answered "YES"), the control unit 4 identifies the state of the mobile phone 3 as "temporarily stopped" or "stopped" (step S56), ends the state identification process in "stopped" streaming status, and returns to the user operation input check process.

If the control unit 4 determines that the play status is "temporarily stopped" (if the query in step S54 is answered "YES"), the control unit 4 identifies the state of the mobile phone 3 as "temporarily stopped" (step S57), ends the state identification process in "stopped" streaming status, and returns to the user operation input check process. If the control unit 4 determines that the play status is "stopped" (if the query in step S55 is answered "YES"), the control unit 4 identifies the state of the mobile phone 3 as "stopped" (step S58), ends the state identification process in "stopped" streaming status, and returns to the user operation input check process.

In other words, when the control unit 4 performing the above-described series determines, as shown in FIG. 7, that the streaming status reported from the BT module 24 is "output in progress", the control unit 4 identifies the state of the mobile phone 3 by giving priority to content indicated play status because the channel for the A2DP is open and the sound data can be transferred. If, on the other hand, the control unit 4 determines that the streaming status reported from the BT module 24 is "stopped", the control unit 4 identifies the state of the mobile phone 3 as "temporarily stopped" or "stopped" in accordance with the content indicated play status because the channel for the A2DP is closed and the sound data cannot be transferred. If the streaming status reported from the BT module 24 is "stopped" and the play status reported from the BT module 24 is "reproduction in progress", "fast-forward in progress", or "rewind in progress", the control unit 4 identifies the state of the mobile phone 3 as "temporarily stopped" or "stopped" without identifying the state of the mobile phone 3 as "reproduction in progress", "fast-forward in progress", or "rewind in progress".

Figure 8:
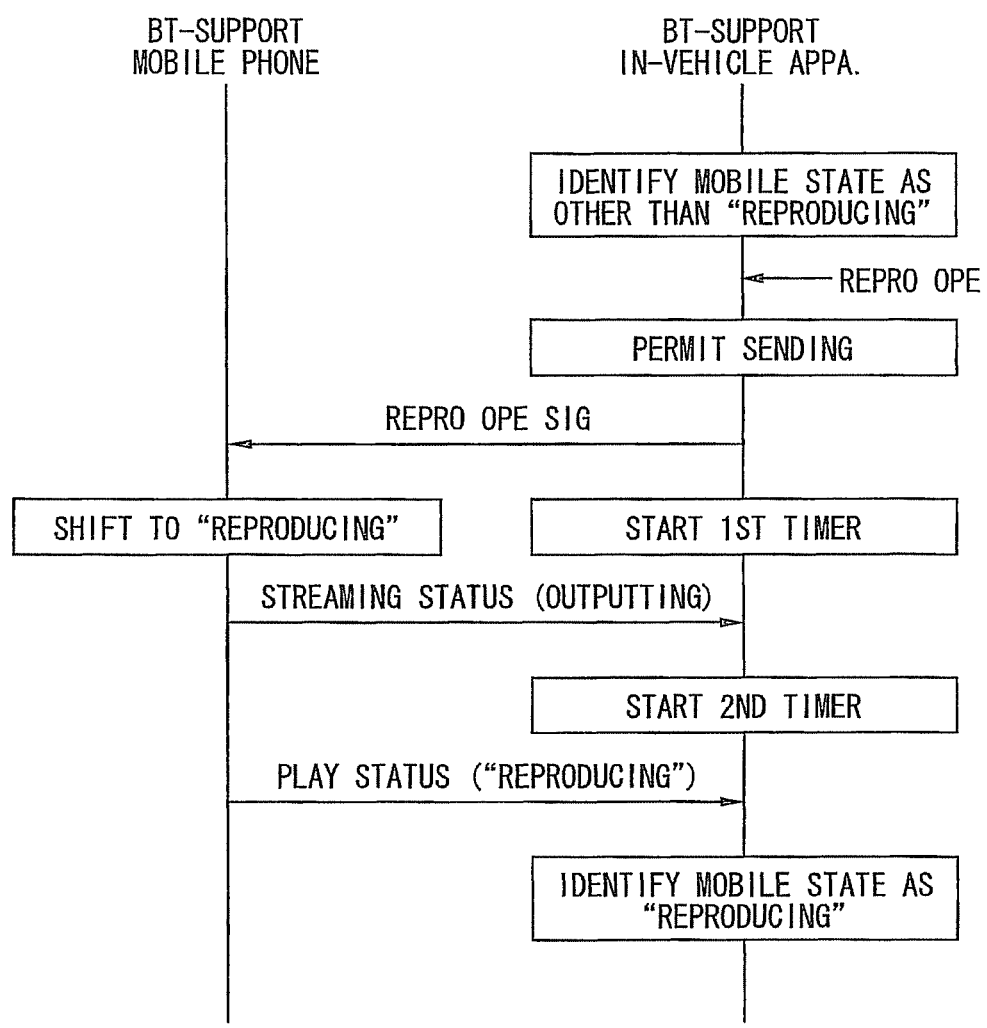
FIG. 8 is a sequence diagram of a cellular phone and an in-vehicle apparatus in a first exemplary case.
Figure 9:
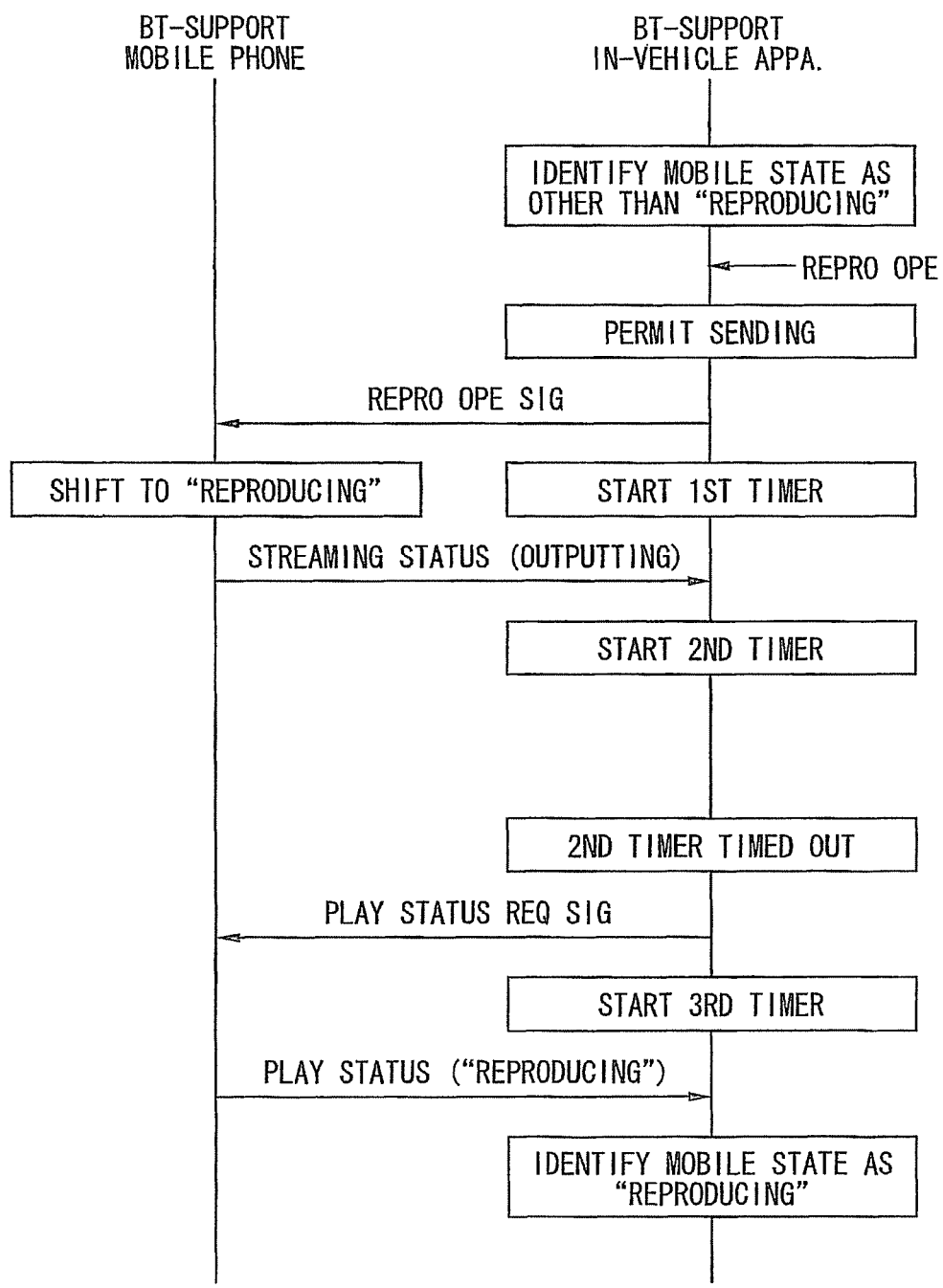
FIG. 9 is a sequence diagram of a cellular phone and an in-vehicle apparatus in a second exemplary case.
Figure 10:
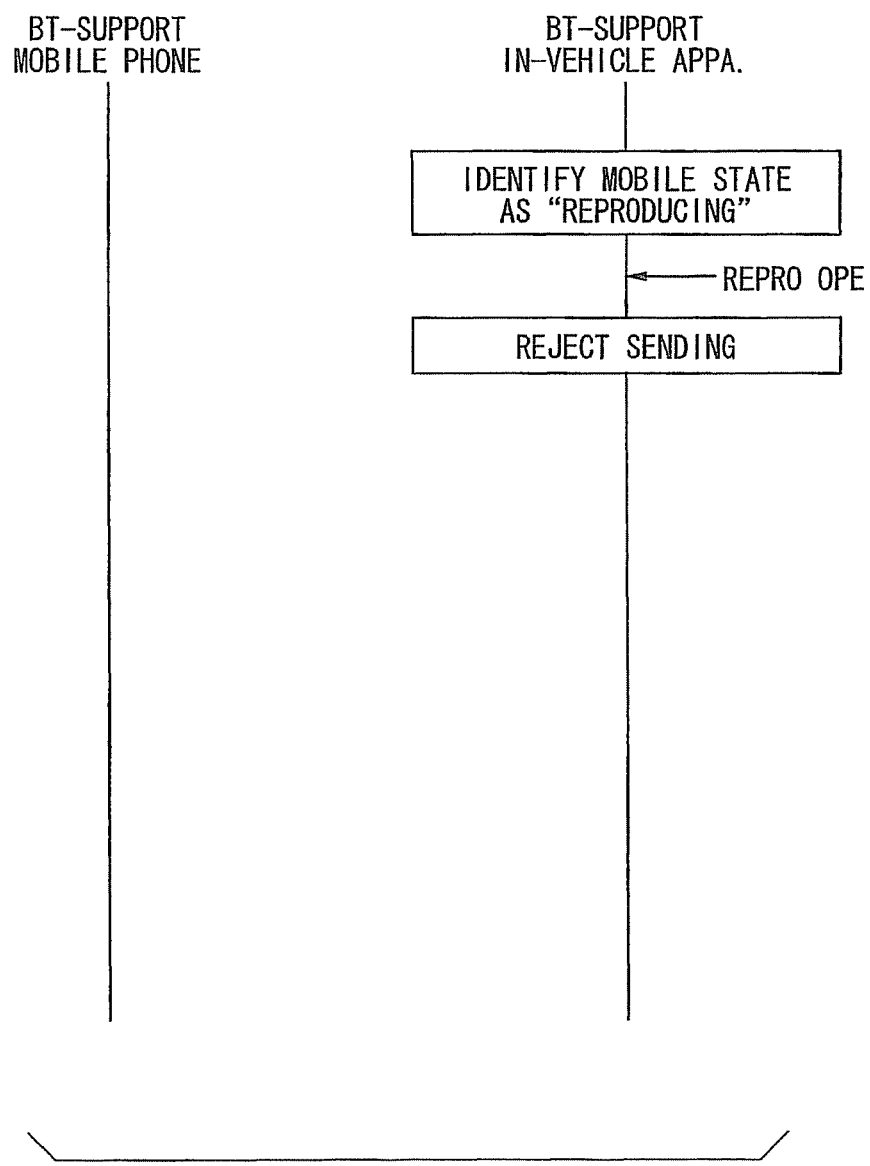
FIG. 10 is a sequence diagram of a cellular phone and an in-vehicle apparatus in a third exemplary case.

Further, as shown in FIGS. 8, 9 and 10, if the user performs the reproduction operation in a situation where the control unit 4 has performed the above-described series of processing steps and determined that the state of the mobile phone 3 is not "reproduction in progress", the control unit 4 determines that the transmission of the reproduction operation signal should be permitted, and allows the reproduction operation signal to be transmitted (see FIGS. 8 and 9). If the user performs the reproduction operation in a situation where the control unit 4 has determined that the state of the mobile phone 3 is "reproduction in progress", the control unit 4 determines that the transmission of the reproduction operation signal should be rejected, and does not allow the reproduction operation signal to be transmitted (see FIG. 10). In other words, if the reproduction operation signal is received from the in-vehicle apparatus 2 during reproduction, the state may change from "reproduction in progress" to "temporarily stopped" or "stopped" depending on the specifications for the mobile phone 3. However, in cases where the user performs the reproduction operation, if the state of the mobile phone 3 changes from "reproduction in progress" to "temporarily stopped" or "stopped", such a behavior is contrary to the user's intention. Therefore, even if the user performs the reproduction operation while the state of the mobile phone 3 is being identified as "reproduction in progress", the control unit 4 does not permit the transmission of the reproduction operation signal. This prevents the state of the mobile phone 3 from changing from "reproduction in progress" to "temporarily stopped" or "stopped" despite the user's intention, allowing the mobile phone 3 to remain in the "reproduction in progress" state.

The above is applicable to not only cases where the state of the mobile phone 3 is identified as "reproduction in progress". Substantially the same is applicable to cases where the state of the mobile phone 3 is identified as "fast-forward in progress", "rewind in progress", "temporarily stopped", or "stopped". More specifically, even if the user performs the fast-forward operation while the state of the mobile phone 3 is being identified as "fast-forward in progress", the control unit 4 does not permit the transmission of the fast-forward operation signal. This prevents the state of the mobile phone 3 from changing from "fast-forward in progress" to other than "fast-forward in progress" despite the user's intention, allowing the mobile phone 3 to remain in the "fast-forward in progress" state. Further, even if the user performs the rewind operation while the state of the mobile phone 3 is being identified as "rewind in progress", the control unit 4 does not permit the transmission of the rewind operation signal. This prevents the state of the mobile phone 3 from changing from "rewind in progress" to other than "rewind in progress" despite the user's intention, allowing the mobile phone 3 to remain in the "rewind in progress" state.

Furthermore, even if the user performs the pause operation while the state of the mobile phone 3 is being identified as "temporarily stopped", the control unit 4 does not permit the transmission of the pause operation signal. This prevents the state of the mobile phone 3 from changing from "temporarily stopped" to other than "temporarily stopped" despite the user's intention, allowing the mobile phone 3 to remain in the "temporarily stopped" state. Moreover, even if the user performs the stop operation while the state of the mobile phone 3 is being identified as "stopped", the control unit 4 does not permit the transmission of the stop operation signal. This prevents the state of the mobile phone 3 from changing from "stopped" to other than "stopped" despite the user's intention, allowing the mobile phone 3 to remain in the "stopped" state.

The above examples are based on assumption that the control unit 4 transmits the play status request signal only once. Alternatively, the control unit 4 may count the number of transmission of the play status request signal, and may transmit the play status request signal multiple times (e.g., a predetermined number of times). Further, if the control unit 4 determines that the play status is not reported although the play status request signal has been transmitted the predetermined number of times, the control unit 4 may notify the user that the play status is not reported from the mobile phone 3, namely, the mobile phone 3, which is a communication destination, has not reported the play status for some reason.

Figure 6:
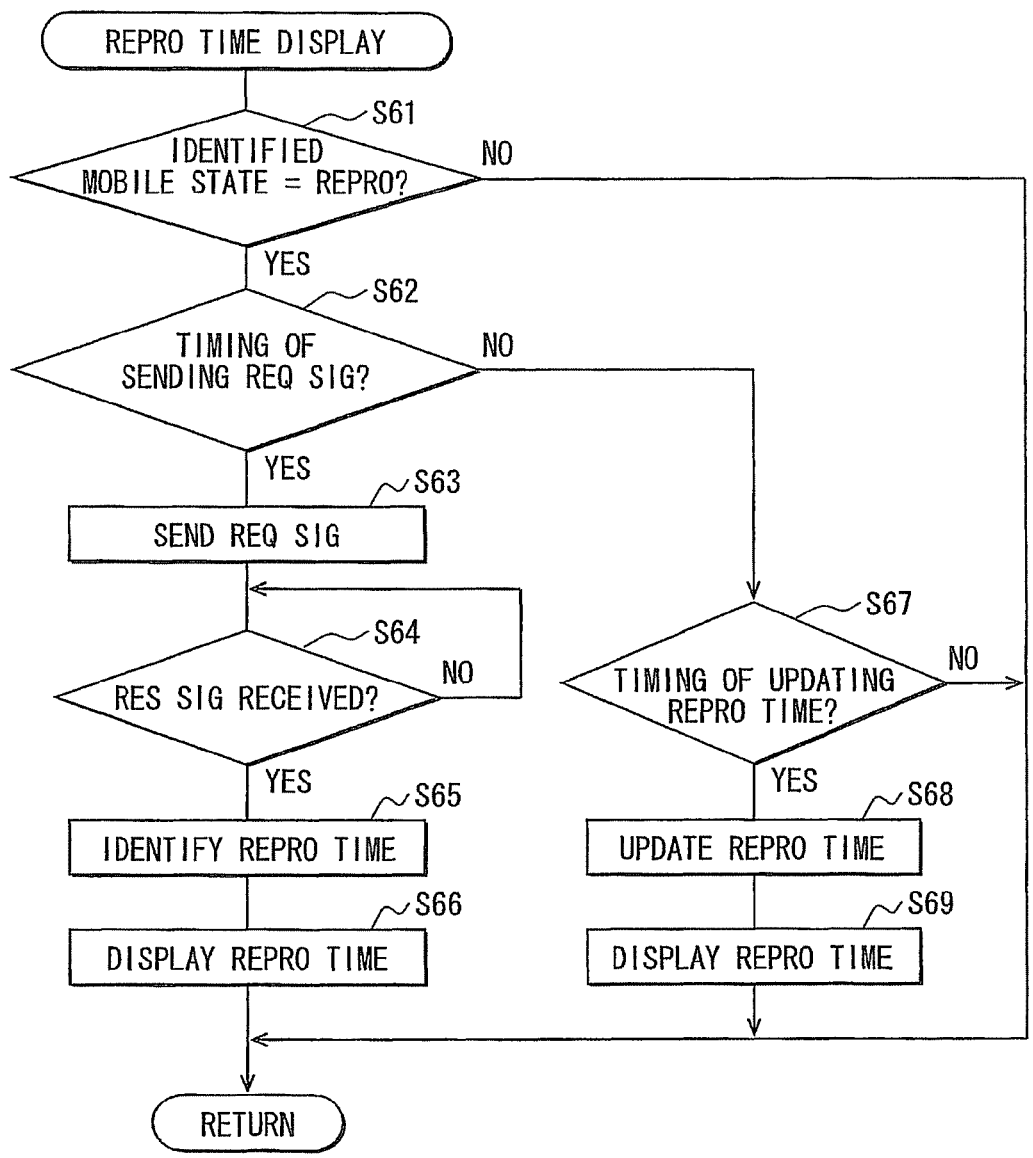
FIG. 6 is a flowchart illustrating a reproduction time display process.

(3) Reproduction Time Display Process (See FIG. 6)

When the process proceeds from the main process to the reproduction time display process and the control unit 4 initiates the reproduction time display process, the control unit 4 determines whether the state of the mobile phone 3 is identified as "reproduction in progress" (step S61). If the control unit 4 determines that the state of the mobile phone 3 is identified as "reproduction in progress" (if the query in step S61 is answered "YES"), the control unit 4 determines whether the predetermined timing of transmitting a reproduction time request signal has arrived (step S62). The timing of transmitting the reproduction time request signal is set, for instance, by a manufacturer of the in-vehicle apparatus 2.

If the control unit 4 determines that the timing of transmitting the reproduction time request signal has arrived (if the query in step S62 is answered "YES"), the control unit 4 allows the BT module 5 to transmit the reproduction time request signal to the BT module 24 (step S63), and waits to receive the reproduction time response signal, which is transmitted from the BT module 24 to the BT module 5 (step S64).

When the control unit 22 of the mobile phone 3 determines that the reproduction time request signal transmitted from the BT module 5 is received by the BT module 24, the control unit 22 allows the BT module 24 to transmit the reproduction time response signal, which indicates the elapsed time (e.g., in seconds) from the start of reproduction, to the BT module 5.

If the control unit 4 determines that the reproduction time response signal transmitted from the BT module 24 is received by the BT module 5 (if the query in step S64 is answered "YES"), the control unit 4 identifies the reproduction time indicated by the reproduction time response signal (step S65), outputs a display command signal to the display control unit 9 to let the display device 20 display the determined reproduction time (step S66), ends the reproduction time display process, and returns to the main process.

If the control unit 4 determines that the timing of transmitting the reproduction time request signal has not arrived (if the query in step S62 is answered "NO"), the control unit 4 determines whether the predetermined timing of updating the reproduction time has arrived (step S67). As is the case with the aforementioned timing of transmitting the reproduction time request signal, the timing of updating the reproduction time is set, for instance, by a manufacturer of the in-vehicle apparatus 2. Preset intervals at which the reproduction time is updated are longer than preset intervals at which the reproduction time request signal is transmitted.

If the control unit 4 determines that the timing of updating the reproduction time has arrived (if the query in step S67 is answered "YES"), the control unit 4 updates the reproduction time, that is, increments its internal counter (step S68), outputs a display command signal to the display control unit 9 to let the display device 20 display the updated reproduction time (step S69), ends the reproduction time display process, and returns to the main process.

Figure 11:
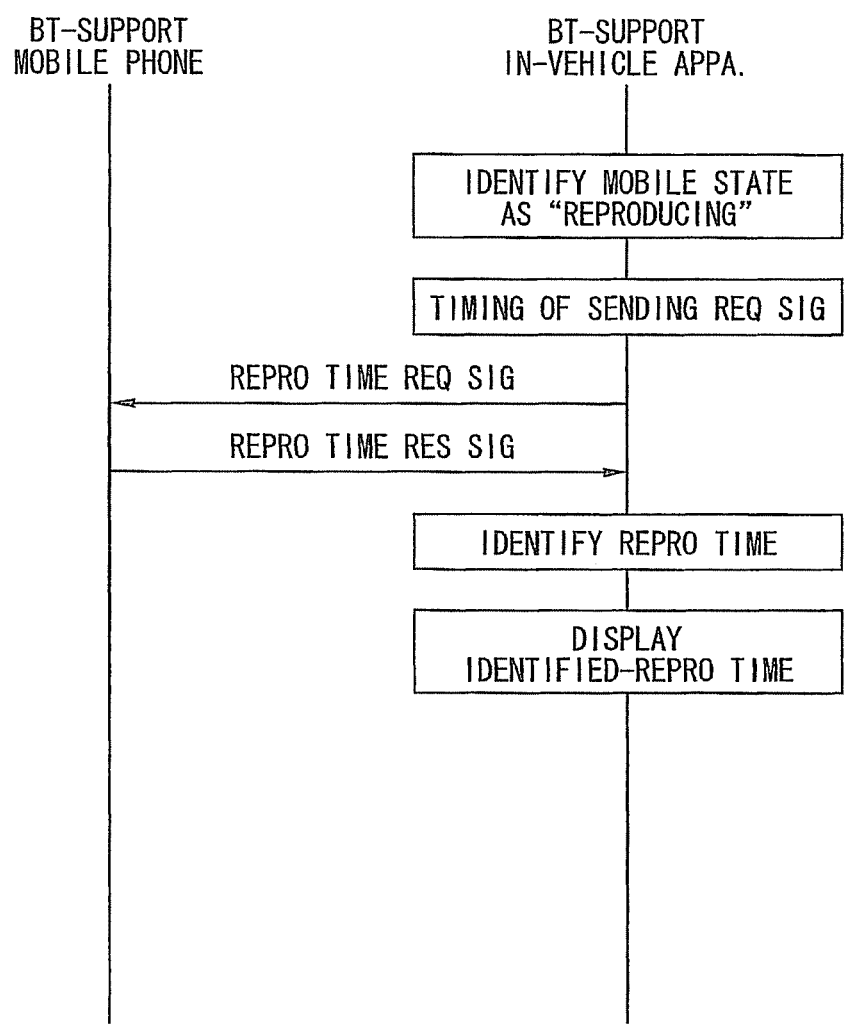
FIG. 11 is a sequence diagram of a cellular phone and an in-vehicle apparatus in a fourth exemplary case.
Figure 12:
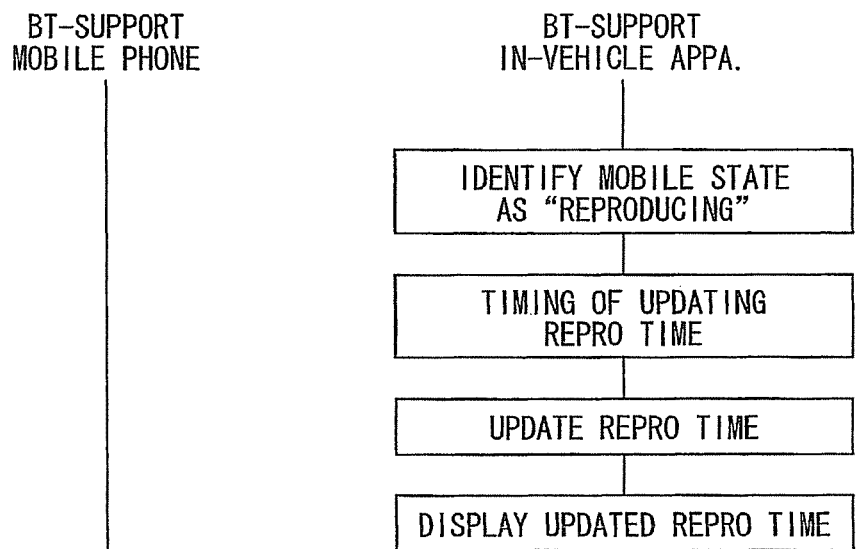
FIG. 12 is a sequence diagram of a cellular phone and an in-vehicle apparatus in a fifth exemplary case.

When the control unit 4 performs the above-described series of steps and determines, as shown in FIGS. 11 and 12, that the state of the mobile phone 3 is identified as "reproduction in progress", the control unit 4 causes the reproduction time request signal to be transmitted at the timing of transmitting the reproduction time request signal. Upon receipt of the reproduction time response signal, the control unit 4 identifies the reproduction time based on the received reproduction time response signal and causes the identified reproduction time to be displayed. Meanwhile, at the timing of updating the reproduction time, the control unit 4 updates the reproduction time and causes the updated reproduction time to be displayed.

As described above, provided that the state of the mobile phone 3 is "reproduction in progress", the control unit 4 can display an appropriate reproduction time as shown in FIG. 13A by transmitting the reproduction time request signal. In this relation, let us consider a comparison example in FIG. 13B in which: the control unit 4 transmits the reproduction time request signal in cases where the state of the mobile phone 3 is "stopped" as is the cases where the state of the mobile phone 3 is "reproduction in progress"; and the control unit 4 identifies the reproduction time as "0" every time the control unit 4 receives the reproduction time response signal from the mobile phone 3; and the inappropriate reproduction time is displayed. The present embodiment can prevent the occurrence of the above failure of the comparison example by prohibiting the transmission of the reproduction time request signal while the state of the mobile phone 3 is other than "reproduction in progress and allowing the transmission of the reproduction time request signal provided that the state of the mobile phone 3 is "reproduction in progress".

As described above, when the streaming status reported from the mobile phone 3 is "output in progress" and the channel for the A2DP is open, the in-vehicle apparatus 2 of the present embodiment identifies the state of the mobile phone 3 preferentially in accordance with the content indicated by the play status (e.g., "reproduction in progress", "fast-forward in progress", "rewind in progress", "temporarily stopped", or "stopped"). Further, when the streaming status reported from the mobile phone 3 is "stopped" and the channel for the A2DP is closed, the in-vehicle apparatus 2 of the present embodiment identifies the state of the mobile phone 3 as "temporarily stopped" or "stopped" in accordance with the indicated play status (so as not identify the state of the mobile phone 3 as "reproduction in progress", "fast-forward in progress", or "rewind in progress"). As a result, it is possible to accurately identify the state of the mobile phone 3. This makes it possible, for instance, to suppress the occurrence of an inconsistency, such as the inability to output the sound data in a situation where the in-vehicle apparatus 2 has notified the user of a "reproduction in progress" state.

Depending on the specifications, some models of the mobile phone 3 may not report the play status immediately after reporting the streaming status. According to the in-vehicle apparatus 2 of the present embodiment, if the play status is not reported from the mobile phone 3 to the in-vehicle apparatus 2 although the second predetermined time has elapsed since the streaming status was reported from the mobile phone 3 to the in-vehicle apparatus 2, the in-vehicle apparatus 2 transmits the play status request signal. Therefore, even when the specifications for an employed model are as mentioned above, the in-vehicle apparatus 2 can acquire the play status.

Furthermore, in the present embodiment, if, for instance, the user inputs a reproduction operation while the state of the mobile phone 3 is being identified as "reproduction in progress", the in-vehicle apparatus 2 is prohibited from transmitting the reproduction operation signal to the mobile phone 3. Therefore, it is possible to maintain the mobile phone 3 in the "reproduction in progress" state. Similarly, even if the user inputs a fast-forward operation, a rewind operation, a pause operation, or a stop operation while the state of the mobile phone 3 is being identified as "fast-forward in progress", "rewind in progress", "temporarily stopped", or "stopped", the in-vehicle apparatus 2 is prohibited from transmitting the fast-forward operation signal, rewind operation signal, pause operation signal, or stop operation signal. Therefore, it is possible to maintain the communication destination apparatus in the "fast-forward in progress" state, "rewind in progress" state, "temporarily stopped" state, or "stopped" state.

Moreover, in the present embodiment, provided that the state of the mobile phone 3 is being identified as "reproduction in progress, the in-vehicle apparatus 2 transmits the reproduction time request signal to the mobile phone 3. Therefore, the reproduction time indicative of the elapsed time from the start of reproduction can be reported to the user. In addition, the transmission of the reproduction time request signal under a situation where the mobile phone 3 is actually in the "temporarily stopped" state or in the "stopped" state can be prevented by accurately identifying the state of the mobile phone 3. Because of this, it is possible to prevent the unnecessary transmission of the reproduction time request signal, it is possible to achieve power savings, and further, it is possible to n appropriately notify the user of a reproduction time.

Embodiments are not limited to the above-described embodiments. For example, the above-described embodiments can be combined, modified or expanded in various ways, examples of which will be described.

The short-range wireless communication apparatus need not always be the in-vehicle apparatus 2, but may be a navigation apparatus having a navigation function or other apparatus as far as the short-range wireless communication apparatus includes a BT module having a function corresponding to that of the BT module 5. Furthermore, the short-range wireless communication apparatus may be an apparatus that is not mounted on a vehicle. The communication destination apparatus, which is a data communication destination for the short-range wireless communication apparatus, need not always be the mobile phone 3 but may be a mobile information terminal or the like as far as the communication destination apparatus includes a BT module having a function corresponding to that of the BT module 24. Additionally, the communication destination apparatus may be a fixed terminal, which is not portable by the user.

The present disclosure has various aspects. For example, according to an aspect of the present disclosure, a short-range wireless communication apparatus comprising an own connection device and a control device can be configured as follows. The own connection device is capable of connecting a sound data transfer protocol, which has a function of reporting a streaming status concerning sound data, and a control data transfer protocol, which has a function of reporting a play status concerning the sound data, to a communication destination side connection device, which is a connection device of a communication destination apparatus and is other than the own connection device, via a short-range wireless communication line. The control device identifies state of the communication destination apparatus based on the streaming status reported from the communication destination side connection device with use of the sound data transfer protocol and the play status reported from the communication destination side connection device with use of the control data transfer protocol. When the control device determines that the streaming status reported from the communication destination side connection device with use of the sound data transfer protocol is an output-in-progress state indicating that a channel for the sound data transfer protocol is open, the control device identifies the state of the communication destination apparatus in accordance with the play status reported from the communication destination side connection device with use of the control data transfer protocol. When the control device determines that the streaming status reported from the communication destination side connection device with use of the sound data transfer protocol is a stopped state indicating that the channel for the sound data transfer protocol is closed, the control device identifies the state of the communication destination apparatus as one of a temporarily-stopped state and a stopped state even if the play status reported from the communication destination side connection device with use of the control data transfer protocol is a reproduction-in-progress state.

According to the above configuration, when the streaming status is the output-in-progress state, that is, when the channel for the sound data transfer protocol is open, the sound data can be transferred. Therefore, when the streaming status is the output-in-progress state, it is possible to identify the state of the communication destination apparatus by preferentially following the play status (e.g., a reproduction-in-progress state, a fast-forward-in-progress state, a rewind-in-progress state, a temporarily-stopped state, a stopped state). Meanwhile, when the streaming status is "stopped", that is, when the channel for the sound data transfer protocol is closed, the sound data cannot be transferred (transfer is impossible). Therefore, when the streaming status is "stopped", it is possible to identify the state of the communication destination apparatus as one of the temporarily-stopped state and the stopped state in accordance with the play status (the state of the communication destination apparatus is prohibited from being identified as the reproduction-in-progress state, the fast-forward-in-progress state and the rewind-in-progress state). As a result, the state of the communication destination apparatus can be accurately identified.

The above short-range wireless communication apparatus may be configured as follows. When the control device determines that the streaming status reported from the communication destination side connection device with use of the sound data transfer protocol is an output-in-progress state and that the play status reported from the communication destination side connection device with use of the control data transfer protocol is the reproduction-in-progress state, the control device identifies the state of the communication destination apparatus as the reproduction-in-progress state. When the control device determines that the streaming status reported from the communication destination side connection device with use of the sound data transfer protocol is the output-in-progress state and that the play status reported from the communication destination side connection device with use of the control data transfer protocol is a fast-forward-in-progress state, the control device identifies the state of the communication destination apparatus as the fast-forward-in-progress state. When the control device determines that the streaming status reported from the communication destination side connection device with use of the sound data transfer protocol is the output-in-progress state and that the play status reported from the communication destination side connection device with use of the control data transfer protocol is a rewind-in-progress state, the control device identifies the state of the communication destination apparatus as the rewind-in-progress state. When the control device determines that the streaming status reported from the communication destination side connection device with use of the sound data transfer protocol is the output-in-progress state and that the play status reported from the communication destination side connection device with use of the control data transfer protocol is the temporarily-stopped state, the control device identifies the state of the communication destination apparatus as the temporarily-stopped state. When the control device determines that the streaming status reported from the communication destination side connection device with use of the sound data transfer protocol is the output-in-progress state and that the play status reported from the communication destination side connection device with use of the control data transfer protocol is the stopped state, the control device identifies the state of the communication destination apparatus as the stopped state.

According to the above configuration, when the streaming status is the output-in-progress state, the state of the communication destination apparatus can be determined in the following way in accordance with the reported play status. When the play status is the reproduction-in-progress state, the state of the communication destination apparatus can be determined as the reproduction-in-progress state. When the play status is the fast-forward-in-progress state, the state of the communication destination apparatus can be determined as the fast-forward-in-progress state. When the play status is the rewind-in-progress state, the state of the communication destination apparatus can be determined as the rewind-in-progress state. When the play status is the temporarily-stopped state, the state of the communication destination apparatus can be determined as the temporarily-stopped state. When the play status is the stopped state, the state of the communication destination apparatus can be determined as the stopped state.

The above short-range wireless communication apparatus may be configured as follows. When the control device determines that although a predetermined time has elapsed since the streaming status was reported from the communication destination side connection device, the play status has not been reported within the predetermined period, the control device causes the own connection, device to transmit a play status request signal to the communication destination apparatus to request the communication destination side connection device to transmit the play status.

Depending on the specifications for the communication destination apparatus, the communication destination apparatus may not report the play status immediately after reporting the streaming status. In view of this, according to the above configuration, if the play status has not reported within the predetermined time starting from the reporting of the stream status, the play status request signal is transmitted to the communication destination apparatus. Therefore, even if the communication destination apparatus is designed to not report the play status immediately after reporting the streaming status, the communication destination apparatus can report the play status upon receipt of the play status request signal from the short-range wireless communication apparatus. As a result, the play status can be acquired.

The above short-range wireless communication apparatus may further comprise an operation input device for inputting a user operation. When the control device determines that the user operation inputted from the operation input device is in disagreement with the currently-identified state of the communication destination apparatus, the control device permits the own connection device to transmit an operation signal corresponding to the inputted user operation to the communication destination side connection device of the communication destination apparatus. When the control device determines that the inputted user operation is in agreement with the currently-identified state of the communication destination apparatus, the control device prohibits the own connection device from transmitting the operation signal corresponding to the inputted user operation to the communication destination side connection device of the communication destination apparatus.

Depending on the specifications for the communication destination apparatus, if the communication destination apparatus determines, upon receipt of the operation signal, that the user operation indicated by the operation signal is in agreement with the prevailing state of the communication destination apparatus, the communication destination apparatus may shift the state thereof to another data without maintaining the prevailing state. In view of this, according to the above configuration, if the control device determines that the user operation us in agreement with the prevailing state of the communication destination apparatus, the operation signal corresponding to the inputted user operation is prohibited from being transmitted to communication destination apparatus. Therefore, it is possible to maintain the prevailing state (which prevails when it is, determined the user operation is in agreement with the state of the communication destination apparatus) without shifting to another state. Because of this, the shifting of the state of the communication destination apparatus contrary to the user's intention can be prevented. Additionally, if it is determined that the user operation is in disagreement with the state of the communication destination apparatus, the short-range wireless communication apparatus transmits the operation signal corresponding to the inputted user operation, thereby making it possible to shift the state of the communication destination apparatus in accordance with the user's intention.

The above short-range wireless communication apparatus may be configured as follows. When the control device determines that a reproduction operation is inputted as the user operation to the operation input device while the state of the communication destination apparatus is being identified as the reproduction-in-progress state, the control device prohibits the own connection device from transmitting the operation signal corresponding to the reproduction operation to the communication destination side connection device of the communication destination apparatus. When the control device determines that a fast-forward operation is inputted as the user operation to the operation input device while the state of the communication destination apparatus is being identifies as the fast-forward-in-progress state, the control device prohibits the own connection device from transmitting the operation signal corresponding to the fast-forward operation to the communication destination side connection device of the communication destination apparatus. When the control device determines that a rewind operation is inputted as the user operation to the operation input device while the state of the communication destination apparatus is being identifies as the rewind-in-progress state, the control device prohibits the own connection device from transmitting the operation signal corresponding to the rewind operation to the communication destination side connection device of the communication destination apparatus. When the control device determines that a pause operation is inputted as the user operation to the operation input device while the state of the communication destination apparatus is being identifies as the temporarily-stopped state, the control device prohibits the own connection device from transmitting, the operation signal corresponding to the pause operation to the communication destination side connection device of the communication destination apparatus. When the control device determines that a stop operation is inputted as the user operation to the operation input device while the state of the communication destination apparatus is being identifies as the stopped state, the control device prohibits the own connection device from transmitting the operation signal corresponding to the stop operation to the communication destination side connection device of the communication destination apparatus.

According to the above configuration, even if the user performs the reproduction operation in a state where the state of the communication destination apparatus is identified as the reproduction-in-progress state, it is possible to maintain the communication destination apparatus in the reproduction-in-progress state by prohibiting the transmission of the reproduction operation signal. Even if the user performs the fast-forward operation in a state where the state of the communication destination apparatus is identified as the fast-forward-in-progress state, it is possible to maintain the communication destination apparatus in the fast-forward-in-progress state by prohibiting the transmission of the fast-forward operation signal. Even if the user performs the rewind operation in a state where the state of the communication destination apparatus is identified as the rewind-in-progress state, it is possible to maintain the communication destination apparatus in the rewind-in-progress state by prohibiting the transmission of the rewind operation signal. Even if the user performs the pause operation in a state where the state of the communication-destination apparatus is identified as the temporarily-stopped state", it is possible to maintain the communication destination apparatus in the temporarily-stopped state by prohibiting the transmission of the pause operation signal. Even if the user performs the stop operation in a state where the state of the communication destination apparatus is identified as the stopped state, it is possible to maintain the communication destination apparatus in the stopped state by prohibiting the transmission of the stop operation signal.

The above short-range wireless communication apparatus may be configured as follows. Provided that the state of the communication destination apparatus is identified as the reproduction-in-progress state, the own connection device transmits a reproduction time request signal requesting the communication destination side connection device to transmit a reproduction time response signal, which enables identification of an elapsed time from start of reproduction of the sound data. When the control device determines that the reproduction time response signal transmitted from the communication destination side connection device is received by the own connection device, the control device causes a reproduction time reporting device to report a reproduction time indicated by the reproduction time response signal.

According to the above configuration, by receiving the reproduction time response signal transmitted from the communication destination apparatus, the short-range wireless communication apparatus can acquire the reproduction time indicative of the elapsed time from the start of reproduction and can report it to the user. Further, by accurately indentifying the state of the communication destination apparatus, it is possible to prevent the transmission of the reproduction time request signal when the state of the communication destination apparatus is actually "temporarily stopped" or "stopped". This prevents the unnecessary transmission of the reproduction time request signal, thereby saving power consumption.

The above short-range wireless communication apparatus may be configured as follows. The control device causes the own connection device to periodically transmit the reproduction time request signal to the communication destination side connection device based on preset transmission timing. According to this configuration, the reproduction time indicative of the elapsed time from the start of reproduction can be periodically acquired from the communication destination apparatus and reported to the user The above short-range wireless communication apparatus may be configured as follows. During a period during which the control device prohibits the own connection device from transmitting the reproduction time request signal to the communication destination side connection device of the communication destination apparatus, the control device causes the reproduction time reporting device to report a reproduction time that is periodically updated based on (i) preset update timing and (ii) the reproduction time indicated by the reproduction time response signal. In other words, during the period during which the control device prohibits the own connection device from transmitting the reproduction time request signal to the communication destination side connection device of the communication destination apparatus, the control device causes the reproduction time reporting device to report the reproduction time, by periodically updating the reproduction time based on the preset update timing.

According to the above configuration, when the reproduction time response signal transmitted from the communication destination apparatus is received, the reproduction time can be reported to the user. In addition, even during the period during which the reproduction time response time is not received from the communication destination apparatus, it is possible to report the reproduction time indicative of the elapsed time from the start of reproduction to the user by periodically updating the reproduction time (which is determined by the reproduction time response signal based on the preset update timing. Further, if the reproduction time request signal is transmitted while the state of the communication destination apparatus is actually the temporarily-stopped state or the stopped state, the reproduction time "zero" may be reported (the reproduction time is initialized) each time the reproduction time response signal is received regardless of whether the reproduction time is updated based on the update timing, and as a result, an inappropriate reproduction time is reported to the user. However, according to the above short-range wireless communication apparatus, since the short-range wireless communication apparatus can accurately determine the state of the communication destination apparatus, the short-range wireless communication apparatus can report an appropriate reproduction time without reporting an inappropriate reproduction time.

The above short-range wireless communication apparatus may be configured as follows. When the control device determines that the streaming status reported from the communication destination side connection device with use of the sound data transfer protocol is the stopped state and the play status reported from the communication destination side connection device with use of the control data transfer protocol is the reproduction-in-progress state, the control device identifies the state of the communication destination apparatus as one of the stopped state and the temporarily-stopped. When the control device determines that the streaming status reported from the communication destination side connection device with use of the sound data transfer protocol is the stopped state and the play status reported from the communication destination side connection device with use of the control data transfer protocol is a fast-forward-in-progress state, the control device identifies the state of the communication destination apparatus as one of the stopped state and the temporarily-stopped. When the control device determines that the streaming status reported from the communication destination side connection device with use of the sound data transfer protocol is the stopped state and the play status reported from the communication destination side connection device with use of the control data transfer protocol is a rewind-in-progress state, the control device identifies the state of the communication destination apparatus as one of the stopped state and the temporarily-stopped. When the control device determines that the streaming status reported from the communication destination side connection device with use of the sound data transfer protocol is the stopped state and the play status reported from the communication destination side connection device with use of the control data transfer protocol is the temporarily-stopped state, the control device identifies the state of the communication destination apparatus as the temporarily-stopped state. When the control device determines that the streaming status reported from the communication destination side connection device with use of the sound data transfer protocol is the stopped state and the play status reported from the communication destination side connection device with use of the control data transfer protocol is the stopped state, the control device identifies the state of the communication destination apparatus as the stopped state.

According to the above configuration, when the streaming status is the stopped state, the state of the communication destination apparatus can be determined in the following way in accordance with the reported play status. When the play status is the reproduction-in-progress state, the state of the communication destination apparatus is identified as one of the stopped state and the temporarily-stopped. When the play status is a fast-forward-in-progress state, the state of the communication destination apparatus is identified as one of the stopped state and the temporarily-stopped. When the play status is a rewind-in-progress state, the state of the communication destination apparatus is identified as one of the stopped state and the temporarily-stopped. When the play status is the temporarily-stopped state, the state of the communication destination apparatus is identified as the temporarily-stopped state. When the play status is the stopped state, the state of the communication destination apparatus is identified as the stopped state.

It should be noted that the present disclosure is intended to cover various modification and equivalent arrangements. In addition, while the various combinations and configurations, other combinations and configurations, including more, less or only a single element, are also within the spirit and scope of the present disclosure.

What is claimed is:

1. A short-range wireless communication apparatus comprising:
    an own connection device that is capable of connecting a sound data transfer protocol, which has a function of reporting a streaming status concerning sound data, and a control data transfer protocol, which has a function of reporting a play status concerning the sound data, to a communication destination side connection device of a communication destination apparatus via a short-range wireless communication line; and
    a control device that identifies state of the communication destination apparatus based on the streaming status reported from the communication destination side connection device with use of the sound data transfer protocol and the play status reported from the communication destination side connection device with use of the control data transfer protocol,
    wherein:
    when the control device determines that the streaming status reported from the communication destination side connection device with use of the sound data transfer protocol is an output-in-progress state indicating that a channel for the sound data transfer protocol is open, the control device identifies the state of the communication destination apparatus by preferentially following content indicated by the play status reported from the communication destination side connection device with use of the control data transfer protocol; and when the control device determines that the streaming status reported from the communication destination side connection device with use of the sound data transfer protocol is a stopped state indicating that the channel for the sound data transfer protocol is closed, the control device identifies the state of the communication destination apparatus as one of a temporarily-stopped state and a stopped state in accordance with content indicated by the play status reported from the communication destination side connection device with use of the control data transfer protocol.

2. The short-range wireless communication apparatus according to claim 1, wherein:

the control device performs at least one of the following operations:

when the control device determines that the streaming status reported from the communication destination side connection device with use of the sound data transfer protocol is the output-in-progress state and that the play status reported from the communication destination side connection device with use of the control data transfer protocol is a reproduction-in-progress state, the control device identifies the state of the communication destination apparatus as the reproduction-in-progress state;

when the control device determines that the streaming status reported from the communication destination side connection device with use of the sound data transfer protocol is the output-in-progress state and that the play status reported from the communication destination side connection device with use of the control data transfer protocol is a fast-forward-in-progress state, the control device identifies the state of the communication destination apparatus as the fast-forward-in-progress state;

when the control device determines that the streaming status reported from the communication destination side connection device with use of the sound data transfer protocol is the output-in-progress state and that the play status reported from the communication destination side connection device with use of the control data transfer protocol is a rewind-in-progress state, the control device identifies the state of the communication destination apparatus as the rewind-in-progress state;

when the control device determines that the streaming status reported from the communication destination side connection device with use of the sound data transfer protocol is the output-in-progress state and that the play status reported from the communication destination side connection device with use of the control data transfer protocol is the temporarily-stopped state, the control device identifies the state of the communication destination apparatus as the temporarily-stopped state; and when the control device determines that the streaming status reported from the communication destination side connection device with use of the sound data transfer protocol is the output-in-progress state and that the play status reported from the communication destination side connection device with use of the control data transfer protocol is the stopped state, the control device identifies the state of the communication destination apparatus as the stopped state.

3. The short-range wireless communication apparatus according to claim 1, wherein:

when the control device determines that a predetermined time period has elapsed since the streaming status was reported from the communication destination side connection device and that the play status has not been reported within the predetermined time period, the control device causes the own connection device to transmit a play status request signal to the communication destination apparatus to request the communication destination side connection device to transmit the play status.

4. The short-range wireless communication apparatus according to claim 1, further comprising:

an operation input device for inputting a user operation;

wherein:

when the control device determines that the user operation inputted from the operation input device is in disagreement with the currently-identified state of the communication destination apparatus, the control device permits the own connection device to transmit an operation signal corresponding to the inputted user operation to the communication destination side connection device; and when the control device determines that the inputted user operation is in agreement with the currently-identified state of the communication destination apparatus, the control device prohibits the own connection device from transmitting the operation signal corresponding to the inputted user operation to the communication destination side connection device.

5. The short-range wireless communication apparatus according to claim 4, wherein the control device performs at least one of the following operations:

when the control device determines that a reproduction operation is inputted as the user operation from the operation input device while the state of the communication destination apparatus is being identified as the reproduction-in-progress state, the control device prohibits the own connection device from transmitting the operation signal corresponding to the reproduction operation to the communication destination side connection device;

when the control device determines that a fast-forward operation is inputted as the user operation from the operation input device while the state of the communication destination apparatus is being identifies as the fast-forward-in-progress state, the control device prohibits the own connection device from transmitting the operation signal corresponding to the fast-forward operation to the communication destination side connection device;

when the control device determines that a rewind operation is inputted as the user operation from the operation input device while the state of the communication destination apparatus is being identifies as the rewind-in-progress state, the control device prohibits the own connection device from transmitting the operation signal corresponding to the rewind operation to the communication destination side connection device;

when the control device determines that a pause operation is inputted as the user operation from the operation input device while the state of the communication destination apparatus is being identifies as the temporarily-stopped state, the control device prohibits the own connection device from transmitting the operation signal corresponding to the pause operation to the communication destination side connection device; and when the control device determines that a stop operation is inputted as the user operation to the operation input device while the state of the communication destination apparatus is being identifies as the stopped state, the control device prohibits the own connection device from transmitting the operation signal corresponding to the stop operation to the communication destination side connection device.

6. The short-range wireless communication apparatus according to claim 1, wherein:

provided that the state of the communication destination apparatus is identified as the reproduction-in-progress state, the own connection device transmits a reproduction time request signal requesting the communication destination side connection device to transmit a reproduction time response signal, which enables identification of an elapsed time from start of reproduction of the sound data; and when the control device determines that the reproduction time response signal transmitted from the communication destination side connection device is received by the own connection device, the control device causes a reproduction time reporting device to report a reproduction time indicated by the reproduction time response signal.

7. The short-range wireless communication apparatus according to claim 6, wherein:

the control device causes the own connection device to periodically transmit the reproduction time request signal to the communication destination side connection device based on preset transmission timing.

8. The short-range wireless communication apparatus according to claim 6, wherein:

during a period in which the control device prohibits the own connection device from transmitting the reproduction time request signal to the communication destination side connection device, the control device causes the reproduction time reporting device to report a reproduction time that is periodically updated based on preset update timing and the reproduction time indicated by the reproduction time response signal.

* * * * *